United States Patent [19]

Müller et al.

[11] Patent Number: 5,795,681
[45] Date of Patent: Aug. 18, 1998

[54] STABILIZATION OF HOLOGRAMS FORMED IN GELATIN

[76] Inventors: Helmut Müller, Christian-Gau-Strasse 45 5093, Köln; Jörg Gutjahr, Heideweg 18 51588, Numbrecht, both of Germany

[21] Appl. No.: 765,399
[22] PCT Filed: Jul. 5, 1995
[86] PCT No.: PCT/EP95/02595
    § 371 Date: Mar. 24, 1997
    § 102(e) Date: Mar. 24, 1997
[87] PCT Pub. No.: WO96/02019
    PCT Pub. Date: Jan. 25, 1996

[30] Foreign Application Priority Data

Jul. 9, 1994 [DE] Germany ............... 44 24 268.9

[51] Int. Cl.⁶ ............... G03H 1/04; G03C 5/26; G02B 5/32
[52] U.S. Cl. ............... 430/2; 430/1; 430/430; 430/461; 359/3
[58] Field of Search ............... 430/1, 2, 290, 430/430, 461; 259/1, 3

[56] References Cited

U.S. PATENT DOCUMENTS

| | | | |
|---|---|---|---|
| 2,476,544 | 7/1949 | Harsh et al. | 430/461 |
| 3,264,107 | 8/1966 | Von Wartburg et al. | 430/461 |
| 3,660,091 | 5/1972 | Shankoff et al. | 430/1 |
| 4,187,106 | 2/1980 | Gladden | 430/1 |
| 4,510,221 | 4/1985 | Gorin et al. | 430/2 |
| 4,826,290 | 5/1989 | Wreede et al. | 430/1 |

FOREIGN PATENT DOCUMENTS

| | | |
|---|---|---|
| 3840262 | 5/1990 | Germany . |
| WO/8500672 | 2/1985 | WIPO . |

OTHER PUBLICATIONS

Shankoff et al., Appl. Phys. Lett., 13(7) pp. 239–241, Oct. 1968.
Pennington et al., Appl. Opt., 9(7) pp. 1643–1650, Jul. 1970.
Upatnieks et al., Appl. Opt., 8(1) pp. 85–89, Jan. 1969.
Schmackpfeffer et al., IBM J. Res. Develop., 14(5) pp. 533–538, Sep. 1970.

*Primary Examiner*—Martin Angebranndt
*Attorney, Agent, or Firm*—Baker & Botts, L.L.P.

[57] ABSTRACT

The present invention pertains to a process for the stabilization of Holograms formed on gelatin.

According to the invention, after (i) exposing, (ii) developing, and (iii) quenching said Hologram, there is added thereto (iv) a bleaching bath based on an oxidative cross-linking agent at a pH value of at least 3 or more, and thereafter, following (v) rinsing, (vi) fixing, (vii) additional rinsing and (viii) a final bath, (ix) said support material is dehydrated by the use of one or more baths in series containing a solvent which is water-miscible and does not affect the cured gelatin structure.

In another embodiment, the invention pertains to light-directing wall elements for buildings made of a Holograms obtainable by the process mentioned above and applied to a transparent or opaque substrate.

By means of the present invention, silver-free holographic support materials can be prepared.

2 Claims, No Drawings

STABILIZATION OF HOLOGRAMS FORMED IN GELATIN

The present invention pertains to a process for the stabilization of holographic support materials based on gelatin, and to light-directing wall elements for buildings.

From DE 38 40 262 A1, a transparent wall element is known which has a coating containing a holographic diffraction grating. Incident light can be deflected or reflected thereby depending on the type of the holographic diffraction grating. This wall element is useful, for example, for windows, room partitioners or facade panels and may be employed for improving the room illumination with daylight, for the reflection of heat radiation, or for display purposes.

After the exposure, holographic support materials are processed according to methods which are per se known in the field of photography, for example, from Ullmanns Enzyklopädie der technischen Chemie, 4th edition, vol. 18, item "Photographie", 1979. Holographic support materials which are in particular employed as light-directing wall elements for buildings are exposed to incident light for a large period of time. If such a holographic support material still contains residual silver halide, darkening will occur. P. Hariharan, Optical Holography, Cambridge University, Pren (1984), page 104, 105, describes a process yielding holographic support materials which are said to be light-stable. In this process which is especially adapted to the treatment of photographic plates of the type 649 F manufactured by Kodak, the support material is developed after the exposure and, after quenching the development process, is dipped into a bleaching bath based on an oxidative cross-linking agent to reoxidize the developed silver to $Ag^+$ and thereby to cure the gelatin film locally. The efficiency of 70% given by the authors is not sufficient for technical uses since at least 90% is required in this case. Reworking the process gave no measurable efficiency for a hologram. It is the object of the present invention to overcome this problem.

The above-mentioned problem is solved by a process for the stabilization of holographic support materials based on gelatin, characterized in that after (i) exposing, (ii) developing, and (iii) quenching said support material, there is added thereto (iv) a bleaching bath based on an oxidative cross-linking agent at a pH value of at least 3 or more, and thereafter, following (v) rinsing, (vi) fixing, (vii) additional rinsing and (viii) a final bath, (ix) said support material is dehydrated by the use, of one or more baths in series containing a solvent which is water-miscible and does not affect the cured gelatin structure.

By means of the present invention, it is possible to provide an excellently good stabilization for known holographic supports based on gelatin. After the usual exposing and developing of the holographic diffraction grating, the holographic support material based on gelatin is introduced in a stop bath. As photographic developers, developing materials may be used which are per se known in the prior art. According to the invention, a two-component developer based on ascorbic acid as component A and an alkaline sodium hydrogenphosphate solution containing a lime protection agent as component B has proven to be particularly useful. Optionally, per se known developer additives, such as buffers, anti-oxidants and antifogging agents, may be employed.

In order to quench the developing process quickly and as uniformly as possible, an acidic stop bath known in the field of photography is employed. According to the invention, an 0.5 to 2% by weight aqueous solution of acetic acid has also proven to be particularly useful. Whereas such a stop bath, in the field of photography, may usually contain agents for curing gelatin, for example, formaldehyde or an aluminum salt (curing/stop bath), no curing process is performed in this process step according to the invention since this is inserted as a separate process step prior to the fixing.

The core of the present invention is the bleaching bath based on an oxidative cross-linking agent. Said oxidative cross-linking agent, for example, a combination of (a) an aqueous acidic buffered alkali metal halide solution and (b) an aqueous solution of an oxidative cross-linking agent, is capable of oxidizing developed silver crystals selectively in the gelatin layer. By the redox reaction with elementary silver, the silver is converted to halide and at the same time the gelatin is cross-linked at these very sites to an extent which is different from that in regions of the gelatin where no free silver exists. Thereby, a density gradient from exposed to unexposed regions is generated due to the different degree of cross-linking of the gelatin. If the complete silver halide is subsequently dissolved out of the holographic support material in a fixing bath per se known from photography, a holographic support material is obtained which is completely free of silver and shows no more print-out and fading.

Although in principle the stabilization of photographic support materials is known in the prior art, wherein the non-developed silver halide is only partly dissolved out, the major part thereof remains in the photographic layer as an essentially light-insensitive silver compound along with the penetrated components of the stabilizing bath. The acidic stabilization baths of the prior art contain thiosulfate, thiocyanate, thiourea or organic sulfur compounds, such as thioglycolic acid, thiosalicylic acid or mercaptopyrimidinium derivatives in relatively large amounts.

According to the invention, however, the stabilizing bleaching bath is composed of a two-component mixture. A part (I) of the mixture preferably essentially consists of a buffered aqueous alkali metal halide solution having a pH value of about 4 or more. It has been found according to the invention that pH values in the range of above 3 are suitable for causing the cross-linking of the gelatin whereas usual strongly acidic solutions are unsuitable for controlling the redox reaction of silver and oxidative cross-linking agent such that curing of the gelatin occurs at the exposed sites of the holographic support material which is different from that at other sites where no silver is present. Preferably, component (I) contains sodium citrate, sulfuric acid and potassium bromide whereas the aqueous solution (II) of the oxidative cross-linking agent preferably contains alkali metal chromate, in particular potassium dichromate. The amounts of compounds to be employed can be seen essentially from the example. Those skilled in the art, however, will be able to find other suitable quantity ranges of the individual components without involving an inventive step.

Following the curing bleaching bath, according to the invention, the holographic support material is rinsed. In the subsequent fixing bath, the whole silver halide is dissolved out of the holographic support material. In order to achieve this, known solvents for silver halides, such as ammonia, thiourea, heterocyclic mercapto compounds, concentrated alkali halide solutions, cyanides, thiocyanates and thiosulfates, may also be used according to the invention. Preferably, however, sodium and ammonium thiosulfate are preferably employed for non-curing fixing baths. It is particularly preferred that the non-curing fixing bath contain alkali metal thiosulfate, alkali metal sulfite and alkali metal hydrogensulfite.

In order to obtain stable holographic diffraction gratings, thorough rinsing after fixing is indispensable. Otherwise, fogging may take place in the highlight regions due to the non-leached silver thiosulfate complex decomposing to sulfide.

A final bath containing a wetting agent known from photography, for example, Agepon® or Ilfotol®, achieves that the subsequent baths will uniformly wet the film.

Subsequent to the final bath, it is required according to the invention to dehydrate the holographic support material with one or more baths in series containing a solvent which is water-miscible and does not affect the cured gelatin structure. In particular, ethanol, 2-propanol and mixtures thereof are useful. If at least 2 baths with decreasing water content are used in series, particularly good results can be achieved. If, for example, 2-propanol is employed in a first bath with a concentration of 92 to 96% in aqueous solution, and anhydrous isopropanol is employed in a second step, a complete dehydration of the holographic support material based on gelatin may be achieved. If in addition the solvent is wiped off and removed by slight heating in a further operation step, a stabilized holographic support material is obtainable.

Other embodiments of the present invention are light-directing wall elements for buildings made of a holographic support material obtainable by the process as defined above wherein said support material is applied to a transparent or opaque substrate. Thus, a transparent or reflecting wall element is obtainable having a coating which contains a holographic diffraction grating. In contrast to prior art elements, however, the durability, in particular stability, of the holographic support material is improved.

EXAMPLE

1. Development:

A holographic support material is developed for 5 min using a developer combination consisting of:

A) 36 g/l of ascorbic acid; and

B) 56.8 g/l of sodium hydrogenphosphate ($Na_2HPO_4$), 24 g/l of sodium hydroxide (NaOH), and 2 g/l of lime protection (Calgon®) in a ratio of 1:1 of components A to B.

2. Stop Bath:

The stop bath contained 2% acetic acid ($CH_3COOH$).

3. Bleaching Bath:

The two-component bleaching bath was formed from:

(I) a buffer solution having a pH value of about 4.0, prepared from a mixture of a sodium citrate solution (1/10 mol/l), corresponding to 21 g/l citric acid (80% by volume), and 20% by volume of sodium hydroxide solution (1 mol/l). Sulfuric acid (0.1N) was added in a proportion of 60 parts by volume of sodium citrate solution to 40 parts by volume of acid. 92 g of potassium bromide (KBr) was given to one liter of this buffer solution.

The second part of the two-component bleaching bath (II) was an aqueous solution of 20 g/l of potassium dichromate ($K_2Cr_2O_7$).

The mixing ratio of component (I) to component (II) was 10 parts of component (I) to one part of component (II) in a first experiment. When the proportion of component (I) was increased to 20 or 30 parts to one part of component (II), an optimum curing and bleaching of the holographic support materials was achieved.

4. Rinsing:

Subsequent to the bleaching bath, the holographic support material was rinsed in a per se known manner.

5. Fixing Bath:

The exposed, developed and bleached holographic support material was contacted with a non-curing fixing bath containing 250 g/l of sodium thiosulfate ($Na_2S_2O_3$), 10 g/l of sodium sulfite ($Na_2SO_3$), and 30 g/l of sodium hydrogensulfite ($NaHSO_3$) for 2 min.

6. Rinsing:

Subsequent to the fixing bath, the holographic support material was rinsed in a per se known manner.

7. Final Bath:

In the final bath, the wetting agent Ilfotol® enables the following dehydrating bath to uniformly wet the film.

8. Dehydrating Bath:

In a first dehydrating bath, the holographic support material was contacted with an aqueous solution of isopropanol containing 92 to 96% of isopropanol for 2 min.

9. Further Dehydrating Bath:

In a further dehydrating bath, the holographic support material was contacted with anhydrous isopropanol for 2 min.

10. Drying:

According to per se known methods of the prior art, the excess, solvent was wiped off and the residual solvent removed from the photographic layer by means of a hot-air blower as a final step.

A silver-free holographic support material having an extraordinarily high stability could thus be obtained.

We claim:

1. A process for the stabilization of holograms based upon silver halide photographic plates, characterized in that after (i) holographically exposing a silver halide support material,
(ii) developing said material, and (iii) placing said material into a stop bath, the material is further treated by (iv) placing said material into a bleaching bath based on an oxidative cross-linking agent at a pH value of at least 3 or more, the bleaching bath being a mixture of a buffered aqueous acidic alkali metal halide solution and an aqueous solution of an oxidative cross linking agent, said aqueous buffered alkali metal halide solution having a pH value of about 4 and containing sodium citrate, sulfuric acid and potassium bromide, and thereafter, (v) rinsing, (vi) fixing, (vii) additional rinsing of said material, (viii) placing said material into a final bath, and (ix) subsequently dehydrating said material by the use of one or more baths in series containing a solvent which is water-miscible and does not affect said material.

2. A process for the stabilization of holograms based upon silver halide photographic plates, characterized in that after (i) holographically exposing a silver halide support material,
(ii) developing said material, and (iii) placing said material into a stop bath, the material is further treated by (iv) placing said material into a bleaching bath based on an oxidative cross-linking agent at a pH value of at least 3 or more the bleaching bath being a mixture of a buffered aqueous acidic alkali metal halide solution and an aqueous solution of an oxidative cross linking agent said aqueous solution of an oxidative cross-linking agent contains alkali metal chromate, and thereafter, (v) rinsing, (vi) fixing, (vii) additional rinsing of said material, (viii) placing said material into a final bath, and (ix) subsequently dehydrating said material by the use of one or more baths in series containing a solvent which is water-miscible and does not affect said material.

* * * * *